March 12, 1957

A. B. RUDENAUER 2,784,528

IRRIGATING RING

Filed Oct. 14, 1953

INVENTOR.
ARTHUR B. RUDENAUER
BY
Sanford Schnurmacher
ATTORNEY

United States Patent Office 2,784,528
Patented Mar. 12, 1957

2,784,528

IRRIGATING RING

Arthur B. Rudenauer, Covina, Calif.

Application October 14, 1953, Serial No. 386,055

1 Claim. (Cl. 47—48.5)

This invention relates to irrigators and particularly to irrigators for individual plants, bushes or trees.

Conducive to a better understanding of this invention, it may be well to point out that the proper watering of plants, bushes and trees, especially those used to landscape the area around a house, presents a serious problem in areas where water is not plentiful, such as the western portion of the United States and other semi-arid regions. The ordinary practice of sprinkling the general area around the planting is of course very wasteful of water, due to the run-off which normally occurs when this method is used. Furthermore, the proper watering of most plants requires that the water penetrate deep enough to reach all the roots. In the case of superficial water, as occurs when conventional sprinkling methods are used, the depth of penetration is very slight unless the sprinkling is continued for several hours or more to permit the hard and dry surface to be saturated to the point that deeper penetration can take place. It has been found that if a small head of water, such as two or three inches, can be maintained over the root area of each plant, the subsequent penetration of this quantity of water will adequately irrigate the root system at a substantial saving of water over the sprinkling method. Furthermore, if such controlled irrigation is practiced around stucco structures, the damage caused to the walls by the general sprinkling of foundation planting is prevented.

The primary object of this invention, therefore, is to provide an irrigation ring that can be positioned around individual plants to control and hold the water applied thereto until it can penetrate to root depth.

Another object is to provide such an irrigating device that is economical in its use of water.

A further object is to provide means for the more economical use of fertilizers, since the chemicals leached out of solid fertilizers applied around the base of the plant are held over the roots and penetrate directly to the roots as the water seeps downward within the confines of the irrigator.

Still another object is to provide a device of the type stated that is economical to manufacture and simple in operation.

These and other objects of the invention will become apparent from a reading of the following specification and claim, together with the accompanying drawing, wherein:

Figure 1:
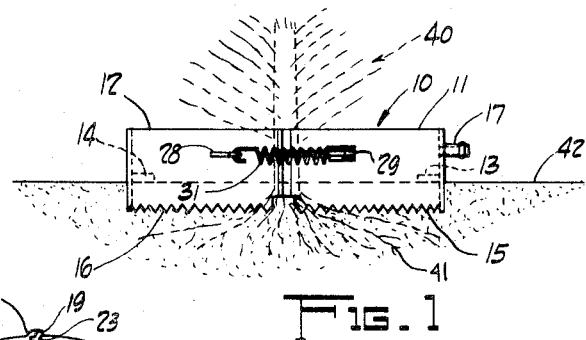
Figure 1 is a front elevation of the irrigating ring that is the subject of this invention shown as it appears in position around a plant.

Referring more particularly to the Figure 1, there is seen the irrigating ring that is the subject of this invention, broadly indicated by the reference numeral 10, as it appears when positioned around the trunk of a bush 40 and over its root area 41.

The ring is made up of two semi-circular segments 11 and 12 held together by spring elements 26 and 31 to form a continuous circular water-tight walled structure. The radius of each segment is determined by the size of the plant and the root area that it is intended to enclose. Each segment 11 and 12 is made of a rigid sheet material, of suitable gage, such as steel, iron or even plastic. Each segment 11 and 12 has a saw toothed lower edge 15 and 16 respectively.

Reference numerals 13 and 14 indicate inwardly and laterally extending flanges spaced upwardly of the toothed edge of segments 11 and 12 respectively, for a purpose to be hereinafter disclosed.

The segment 11 has a gasket seat 21 formed on one end thereof and a smooth face 23 formed on the other end thereof. The segment 12 has a similar gasket seat 18 and a smooth face end 20. Gaskets made of resilient water-repellant material such as rubber are shaped to fit into the seats and receive the smooth faced end of the opposed segments. Gasket 19 fits into seat 18 and gasket 22 fits into seat 21.

Reference numerals 24 and 25 represent bosses positioned on the inside surface of the segments proximate the ends 18 and 23 respectively of the segments 12 and 11.

A hinge plate 27 is positioned on the outer face of the segment 11 proximate its end 21.

A boss 28 is positioned on the outer face of the segment 12 proximate its end 20.

A locking lever 29 is pivotly mounted on the hinge block 27 by means of a cotter pin 30.

Reference numeral 17 indicates a hose connection mounted on one of the segments 11 and extending therethrough to the inner or concave face thereof.

Figure 2:
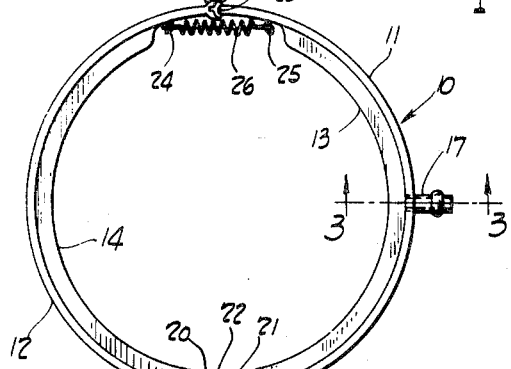
Figure 2 is a top plan view of the irrigating ring.
Figure 3:
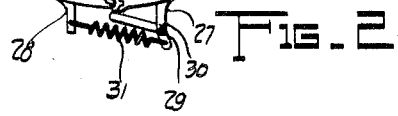
Figure 3 is a vertical sectional view taken along the line and in the direction of the arrows 3—3 of the Figure 2.
Figure 4:
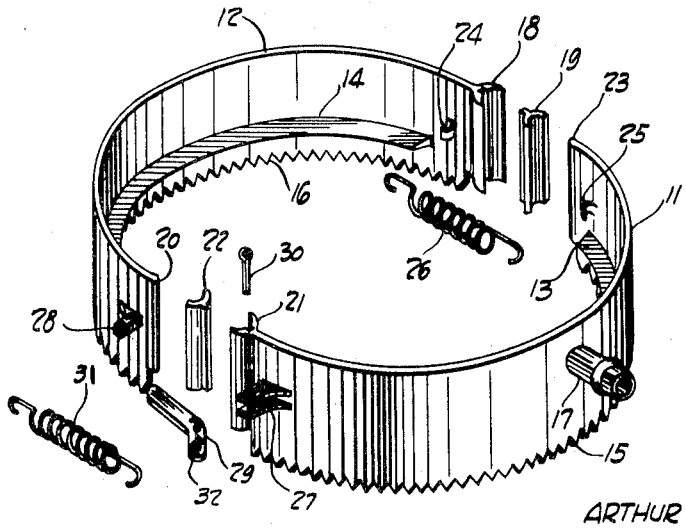
Figure 4 is an exploded view of the device.

In using the irrigating ring, the two segments 11 and 12 are positioned around the trunk or main stem of the plant 40, as seen in the Figure 1, with the gasket 19 of segment 12 positioned opposite the end face 23 of segment 11, and with gasket 22 of segment 11 positioned opposite end face 20 of segment 12. Spring 26 is then hooked between bosses 24 and 25 which draws the face 23 tightly against the gasket 19. The lever 29 is swung to its unlocked position and the spring 31 is hooked to the boss 28 and the hole 32 at the end of the lever 29. The lever 29 is swung to its locked position, as shown in Figure 2, which causes the end face 20 of segment 12 to engage the gasket 22 of segment 11 in a compressed fit.

It will now be seen that a continuous, circular water-tight structure has been created, surrounding the trunk of the plant 40 and resting on the ground surface 42 therebeneath. The assembled ring is now rotated with downward pressure on the teeth 15 and 16 around the plant 40 with its trunk as a center. The ring can thus be forced below the ground surface 42 by the cutting action of the teeth 15 and 16 until the circular flanges 13 and 14 touch the ground. These flanges act as a depth gage and also insure that the ring will penetrate to the same depth all around. The area enclosed by the ring 10, so anchored, may now be filled with water, either by pouring it over the edge, or by means of a hose connected to the tube 17. The ring may be filled to its top edge, so that a predetermined amount of water will be given to each plant. Since the sealing gaskets create a water-tight structure, the water will remain within the ring until it can be absorbed by the ground beneath it. None of the contained water can run off or be otherwise lost. Solid fertilizers may be placed within the ring and dissolved by the contained water. Again, none of the nutritive value of the fertilizer is lost due to run-off. The ring can be removed from its position by pulling it out of the ground and swinging the lever 29 to its unlocked position which will release the tension of the spring 31 so that it can be unhooked from its boss 28. The two segments 11 and 12 can then be swung apart far enough to clear the plant 40.

If desired, it would be possible to make the device as a single unit, if sheet material of a flexible nature is used. In such a case, the joint at the gasket 19 could be dispensed with and the ring merely flexed at that point to open it. The structure surrounding gasket 22 and the spring locking means being retained in this modified form, which is not illustrated in the drawing.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

An irrigating ring, comprising in combination, two complementary semi-circular segments, each of said segments having a toothed bottom edge and a laterally extending flange spaced upwardly of said toothed edge, one of said segments having a bore therethrough proximate its upper edge, each of said segments also having a concave seat at one terminal thereof and a convex seat at the other terminal, a concavo-convex resilient gasket positioned between each of said complementary seats, spring means for joining and releasably holding the segments together with their seats in pressed engagement with the gaskets to form a water-tight ring, and a water conduit seated in the aforesaid bore and venting into the interior of the ring.

References Cited in the file of this patent

UNITED STATES PATENTS

| | | |
|---|---|---|
| 397,732 | Landis | Feb. 12, 1889 |
| 425,890 | Landis | Apr. 15, 1890 |
| 1,843,108 | Clayden | Feb. 2, 1932 |
| 2,184,904 | Boehme | Dec. 26, 1939 |
| 2,594,307 | Valenzuela | Apr. 29, 1952 |